United States Patent [19]
Mueller

[11] Patent Number: 6,098,013
[45] Date of Patent: Aug. 1, 2000

[54] SYSTEM AND METHOD FOR MONITORING EXHAUST GAS HYDROCARBON CONTENT IN INTERNAL COMBUSTION ENGINES

[75] Inventor: Gary P. Mueller, Lafayette, Ind.

[73] Assignee: Caterpillar Inc., Peoria, Ill.

[21] Appl. No.: 09/076,179

[22] Filed: May 11, 1998

[51] Int. Cl.[7] ........................... F02D 41/22; G01M 15/00
[52] U.S. Cl. ..................... 701/112; 73/117.3; 123/198 D
[58] Field of Search ..................... 123/435, 436, 123/676, 198 D, 198 DB, 198 DC; 701/112, 114; 73/23.31, 35.08, 35.09, 116, 117.3

[56] References Cited

U.S. PATENT DOCUMENTS

| | | | |
|---|---|---|---|
| 4,621,603 | 11/1986 | Matekunas | 123/435 |
| 5,036,669 | 8/1991 | Earleson et al. | 60/602 |
| 5,935,188 | 8/1999 | Jaye | 73/117.3 |

*Primary Examiner*—Andrew M. Dolinar
*Attorney, Agent, or Firm*—Haverstock Garrett & Roberts; Alan J. Hickman

[57] ABSTRACT

A system for monitoring the exhaust gas hydrocarbon content of an internal combustion engine includes at least one sensing device for detecting whether expected combustion conditions occur within the combustion chambers and responsively producing signals indicative of whether the expected combustion conditions occur. An electronic controller is connected to the at least one sensing device for receiving signals therefrom, the electronic controller being operable to determine an estimated exhaust gas hydrocarbon content based upon the signals received from the at least one sensing device. In particular, an engine misfire rate may be determined by the electronic controller and the estimated exhaust gas hydrocarbon content may then be determined as a function of at least the determined engine misfire rate.

16 Claims, 3 Drawing Sheets

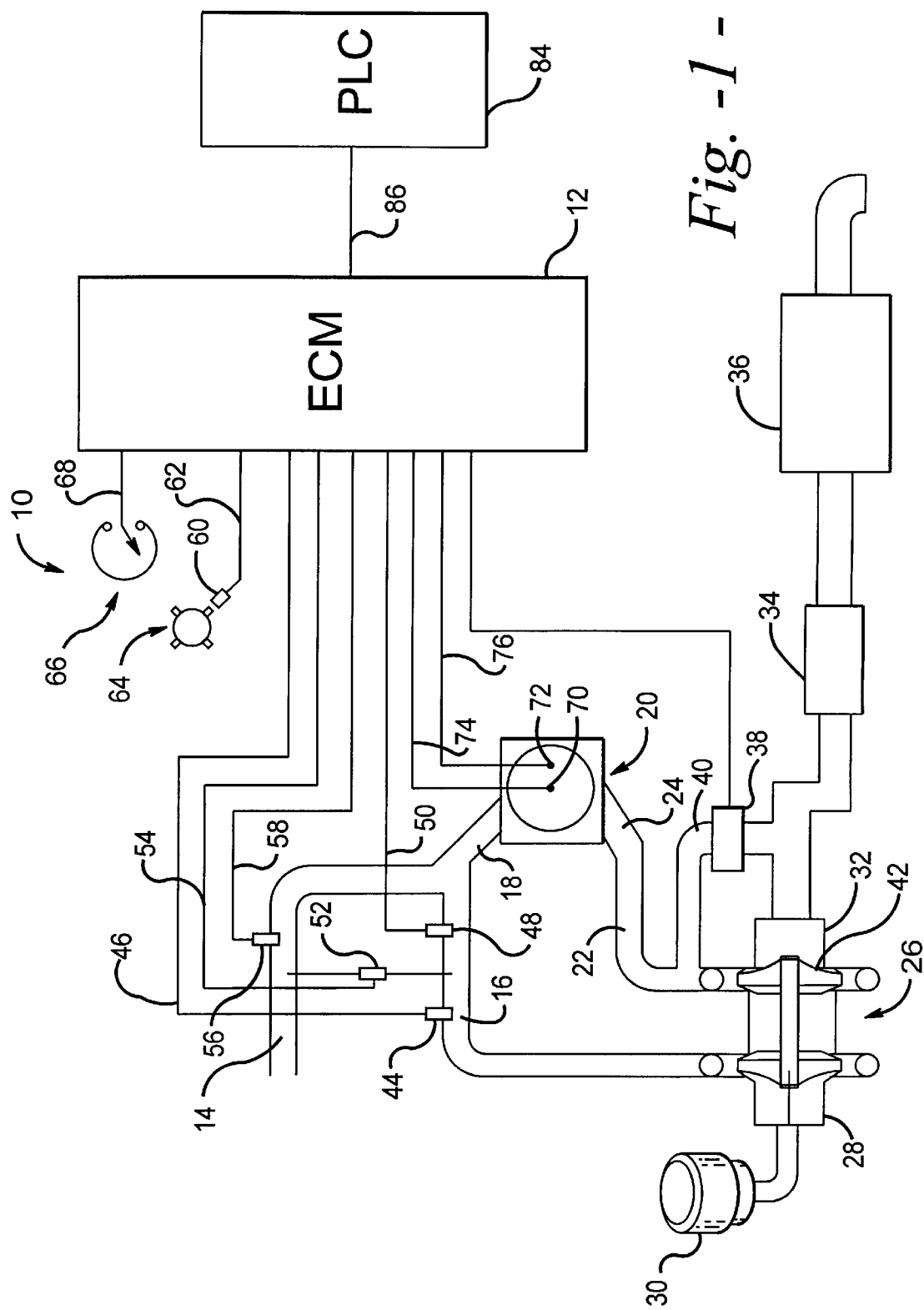
Fig. -1-

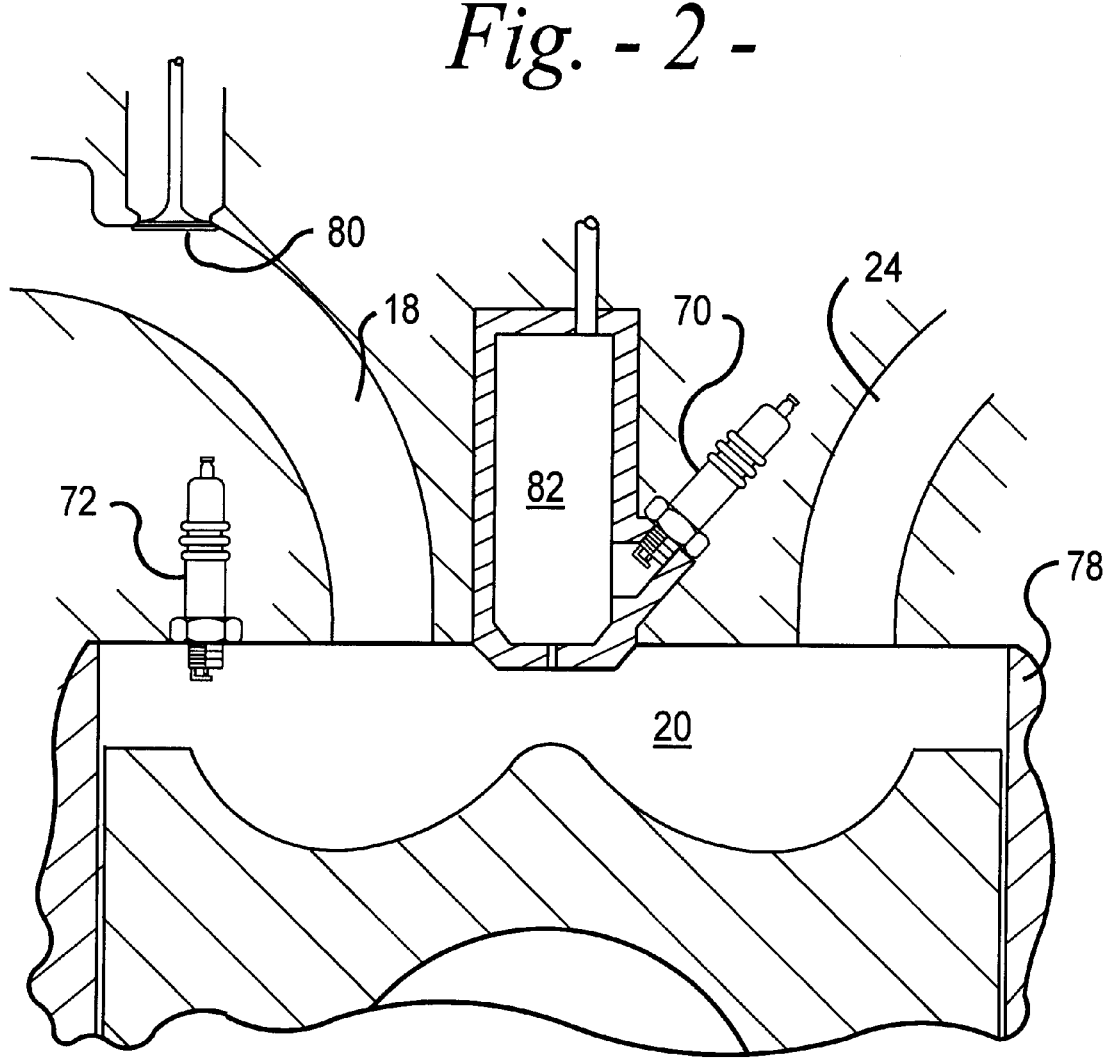
*Fig. - 2 -*

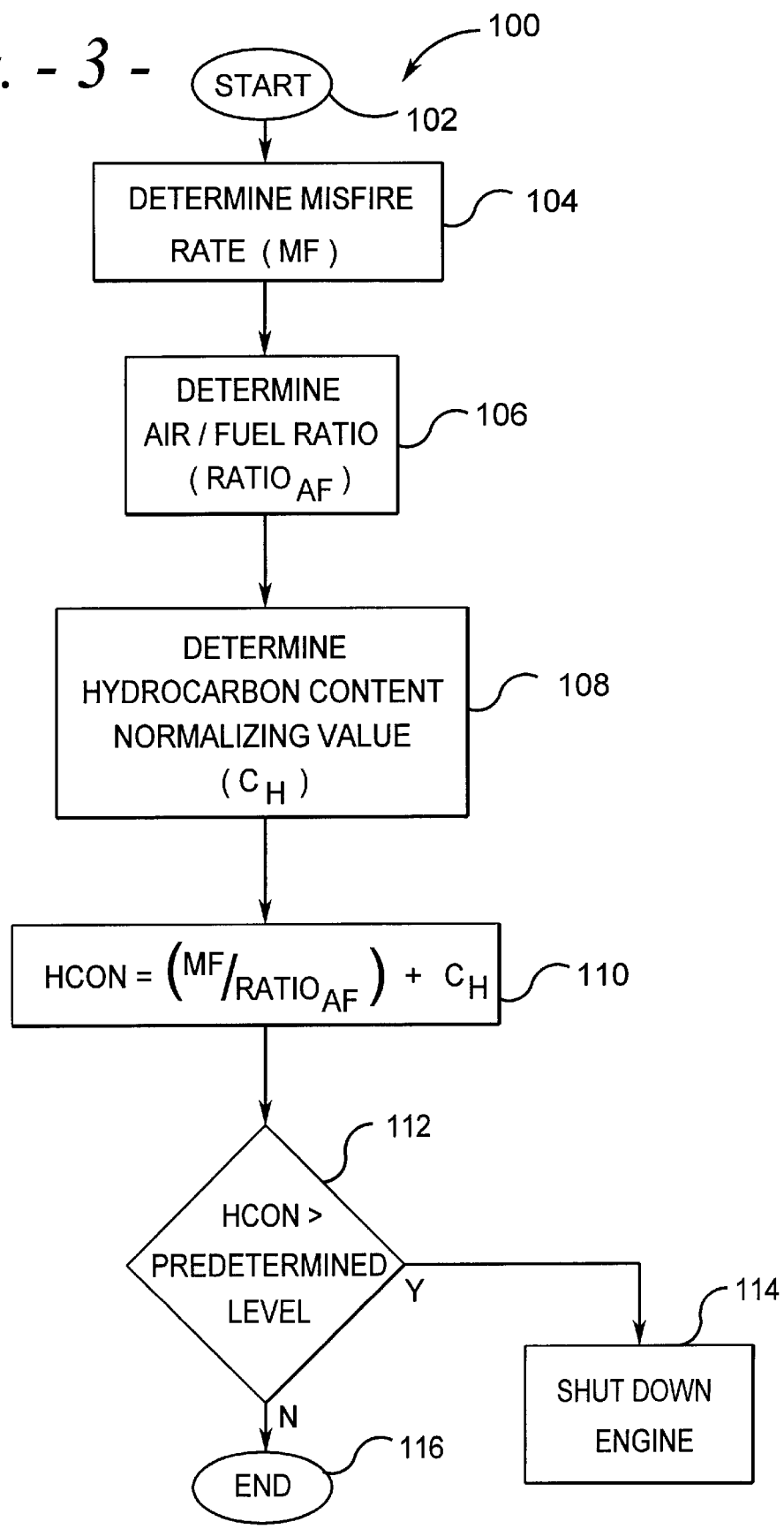

SYSTEM AND METHOD FOR MONITORING EXHAUST GAS HYDROCARBON CONTENT IN INTERNAL COMBUSTION ENGINES

TECHNICAL FIELD

This invention relates generally to internal combustion engines, and more particularly, to a system and method for monitoring the hydrocarbon content of the exhaust gases of an internal combustion engine so as to enable appropriate responsive action in the event such hydrocarbon content exceeds an acceptable level.

BACKGROUND ART

Exhaust paths associated with internal combustion engines typically include a variety of types of devices such as catalytic converters, exhaust heat recovery apparatus, mufflers and other equipment. If the exhaust gas passing along such exhaust paths and through such exhaust path equipment contains an excessive level of hydrocarbons the potential exists for damaging such equipment. For example, excessive hydrocarbons can result in exhaust gas which could combust along the exhaust path resulting in damage to associated exhaust path equipment. Further, if excessive hydrocarbons are passed through a device such as a catalytic converter it is possible that an excessive amount of heat may be generated therein resulting in damage to the catalytic converter. In many applications it is also necessary to assure that the level of hydrocarbons emitted are not excessive for environmental reasons.

Known internal combustion engines may include an exhaust gas probe which is capable of measuring the hydrocarbon content of such gas through relatively complex techniques. Use of probes employing such techniques can significantly increase costs associated with manufacturing and operating internal combustion engines.

Accordingly, the present invention is directed to overcoming one or more of the problems as set forth above.

DISCLOSURE OF THE INVENTION

In one aspect of the present invention a system for monitoring the exhaust gas hydrocarbon content of an internal combustion engine including at least one combustion sensor is provided. The system includes at least one sensing device for detecting whether expected combustion conditions occur within the combustion chamber and responsively producing signals indicative of whether the expected combustion conditions occur. An electronic controller is connected to the at least one sensing device for receiving signals therefrom, the electronic controller being operable to determine an estimated exhaust gas hydrocarbon content based upon the signals received from the at least one sensing device. In particular, an engine misfire rate may be determined by the electronic controller by identifying each absence of an expected combustion condition as a misfire and the estimated exhaust gas hydrocarbon content may then be determined as a function of at least the determined engine misfire rate.

In another aspect of the present invention a method of monitoring the exhaust gas hydrocarbon content of an internal combustion engine including a plurality of combustion chambers is provided. The method includes determining a misfire rate of the engine based upon at least one sensed engine parameter. An estimated exhaust gas hydrocarbon content is then determined as a function of at least the determined misfire rate.

BRIEF DESCRIPTION OF THE DRAWINGS

For a better understanding of the present invention, reference may be made to the accompanying drawings in which:

FIG. 1 is a schematic illustration of one embodiment of an exhaust gas hydrocarbon monitoring system of the present invention;

FIG. 2 is a cross-sectional view of an engine combustion chamber; and

FIG. 3 is a flow chart of operating steps of the present invention.

BEST MODE FOR CARRYING OUT THE INVENTION

Referring to FIG. 1 a schematic illustration of one embodiment of an exhaust gas hydrocarbon content monitoring system 10 of an internal combustion engine (not shown) is depicted. An electronic controller such as electronic control module (ECM) 12 is provided. ECM 12 typically includes processing means, such as a microcontroller or microprocessor, associated memory such as ROM and battery-backed RAM for storing program instructions and data, and associated electronic circuitry such as input/output circuitry and driver circuitry. It is likewise recognized that ECM 12 could take on a variety of processor based configurations.

A fuel manifold or line 14 is connected to an air intake manifold 16 which is in turn connected to an intake port 18 of an engine combustion chamber 20. A single combustion chamber 20 is shown but it is recognized that the present invention is applicable to internal combustion engines which have a plurality of combustion chambers, as well as in-line type engines, v-type engines, or rotary type engines. An engine exhaust manifold 22 is connected to an exhaust port 24 of combustion chamber 20. The intake and exhaust manifolds are further connected to a turbocharger 26 having an intake port 28 which receives air from an air cleaner 30 and having an exhaust port 32 connected to direct exhaust gases through exhaust equipment such as catalytic converter 34 and muffler 36. Turbocharger 26 may typically include a wastegate control valve 38 connected to ECM 12 and disposed along bypass path 40 for controlling the amount of engine exhaust which bypasses the turbocharger turbine wheel 42. Such bypass control enables the air pressure within air intake manifold 16, and consequently the air mass delivered to combustion chamber 20 to be controlled by ECM 12.

A pressure sensor 44 is disposed in air intake manifold 16 and is connected to ECM 12 via electrically conductive path 46. Sensor 44 delivers an air pressure indicative signal over path 46 to ECM 12, such signal preferably having a parameter which varies as the pressure within air intake manifold 16 varies. A temperature sensor 48 is disposed in air intake manifold 16 and is connected to ECM 12 via electrically conductive path 50. Sensor 48 delivers an air temperature indicative signal to ECM 12 over path 50, such signal preferably having a parameter which varies as the temperature within air intake manifold 16 varies.

A fuel pressure sensor 52 is disposed between fuel line 14 and air intake manifold 16 and is connected to ECM 12 via electrically conductive path 54. Sensor 52 delivers a differential pressure indicative signal to ECM 12 over path 54, such signal preferably having a parameter which varies as the pressure differential between fuel line 14 and air intake manifold 16 varies. Alternatively, a pressure sensor could be disposed directly in fuel line 14 for sensing the pressure therein and the processing means of ECM 12 could be programmed to determine the differential pressure based upon the signals received from such sensor and from pressure sensor 44. A temperature sensor 56 is disposed within fuel line 14 and is connected to ECM via electrically conductive path 58. Sensor 56 delivers a fuel temperature indicative signal over path 58 to ECM 12, such signal preferably having a parameter which varies as the temperature within fuel line 14 varies.

An engine speed sensor 60 is connected to ECM 12 via electrically conductive path 62 and produces an engine speed indicative signal which is delivered to ECM 12 via path 58. Engine speed sensor 60 could be mounted for monitoring the speed of a flywheel 64 associated with an engine crankshaft (not shown) and producing a digital speed signal.

A fuel quality dial 66 is connected to ECM 12 via electrically conductive path 68. Dial 66 may be used to input a fuel quality parameter such as BTU content for the particular fuel being used.

Referring to FIGS. 1 and 2, a spark plug 70 is disposed within combustion chamber 20 along with a combustion probe 72, each connected to ECM 12 via respective electrically conductive paths 74 and 76. Combustion probe 72 may be a sensor which detects a flame within combustion chamber 20 and produces a signal in response thereto. Probe 72 might therefore be an optical sensor, or probe 72 might be an ionization sensor including associated circuitry such as timing control means, a magneto buffer interface, and buffer circuit as described in U.S. Pat. No. 5,036,669. It is also recognized that spark plug 70 itself could be used to monitor the ionization level within combustion chamber 20. Combustion probe 72 is utilized to detect whether expected combustion conditions occur within combustion chamber 20. For example, if no combustion signal is produced within a certain time period after firing of spark plug 70 ECM 12 may assume an expected combustion condition did not occur. Alternatively, where a signal parameter is indicative of the level of combustion occurring within combustion chamber 20, if such parameter does not exceed a predetermined level ECM 12 may assume that the expected combustion condition did not occur. The combustion chamber 20 shown in FIG. 2 comprises an upper portion of an engine cylinder 78. Intake port 18 includes a gaseous fuel admission valve 80 for mixing fuel from the fuel line or manifold with the air from the air intake manifold. Spark plug 70 is shown disposed in a precombustion chamber 82. However, it is recognized that a precombustion chamber is not critical to the present invention.

It is also recognized that other types of sensing devices could be utilized to detect whether an expected combustion condition occurs within a given combustion chamber. For example, a suitable pressure sensor could be used to monitor combustion chamber pressure, a temperature sensor 22 could be disposed in exhaust port 24 to monitor the temperature of exhaust gas or could be otherwise positioned to monitor the combustion chamber temperature, a vibration sensor such as an accelerometer could be positioned to detect vibrations produced within combustion chamber 20. Further, the output of an $O_2$ sensor or $NO_x$ sensor positioned along the exhaust path could be correlated to an engine misfire rate for the purpose of the present invention. Still further, it is possible that one or more other engine operating parameters/conditions could be monitored and correlated to an engine misfire rate. Depending upon the number of combustion chambers being monitored the number of sensing devices required may vary. For example, a distinct combustion probe or pressure sensor may be disposed within each combustion chamber. Likewise a distinct temperature sensor may be disposed within the exhaust port of each combustion chamber. With respect to vibration sensors, it is known to position a single vibration sensor for monitoring one or more combustion chambers.

With respect to each of the above-identified engine sensors it is recognized that a variety of sensor types are commonly used in engine applications and are suitable for use with the present invention. Further, it is recognized that an engine incorporating the system 10 of the present invention might typically include a number of other sensors for sensing various other engine operating parameters.

The present invention involves estimating the exhaust gas hydrocarbon content based upon various sensed engine parameters or conditions. A flow chart 100 of operating steps in accordance with the present invention is shown in FIG. 3 and such steps could be incorporated into the programming of the processing means of ECM 12. In some engine systems it is known to include a customer process loop controller (PLC) 84, as shown in FIG. 1, having associated processing means and connected via at least one communication link 86 to receive engine information from ECM 12. Accordingly, the steps of the present invention could also be incorporated into PLC 84, or the various steps may be split between ECM 12 and PLC 84. As used herein the terminology "electronic controller" is intended to cover use of ECM 12 alone, use of PLC 84 alone, use of a combination of the two, as well as the use of other suitable controllers.

START block 102 indicates initiation of the exhaust gas hydrocarbon content monitoring steps of the present invention. In this regard, it is recognized that such monitoring steps could be conducted in a continuously repeating manner, could be conducted periodically at predetermined time intervals, or could even be conducted in response to one or more engine operating conditions which might be indicative of the need for such monitoring.

Regardless of the frequency with which such steps are performed, step 104 involves determining an engine misfire rate, MF. In the illustrated embodiment the electronic controller is operable to determine the engine misfire rate based upon the signals received from the combustion probe or probes. For example, the lack of production of a combustion signal by probe 72 within a certain expected time period after firing of spark plug 70 may be identified as a misfire by the electronic controller. With each identified misfire a counter within the electronic controller can be incremented. After a predetermined time period the misfire rate can be established as the number in the counter divided by the total number of expected combustion conditions. The total number of expected combustion conditions will be a function of the number of engine combustion chambers and the engine speed. Thus, the determined misfire rate MF will essentially be a ratio of misfires over expected number of firings or combustion conditions At step 106 the air/fuel ratio is determined by establishing a ratio of the air flow, AF, to the fuel flow, FF, for the engine. With specific reference to system 10, the air flow may be determined by first reading the intake air pressure, AKPA, via the pressure sensor 44 signal, reading the intake air temperature, ATMP, via the temperature sensor 48 signal, and reading the engine speed, NA, via the speed sensor 60 signal. The air flow is then calculated in accordance with the following equation:

$$AF = (VOL_{EFF} * AKPA * NA)/(ATMP * ACON)$$

where $VOL_{EFF}$ is a value derived from a look-up table or map as a function of engine speed, and where ACON is a constant used to convert mass flow to a volumetric flow. Fuel flow may be determined by additionally reading the differential fuel pressure, FKPA, via the pressure sensor 52 signal, and reading the fuel temperature, FTMP, via the temperature sensor 56 signal. Fuel flow is then calculated according to the following equation:

$$FF=K_{FC}*[((AKPA+FKPA)/(FTMP))*FKPA]^{1/2}$$

where $K_{FC}$ is a fuel constant. The resulting fuel flow value FF is a volumetric fuel flow. The air/fuel ratio, $RATIO_{AF}$, can then be calculated as follows:

$$RATIO_{AF}=AF/FF.$$

A hydrocarbon content normalizing value, $C_H$, is determined at step 108. In particular, such value is determined from a look-up table or map as a function of engine speed and engine load. Engine load may be determined or indicated by the fuel flow, or possibly by a feedback signal in generator applications. The map of $C_H$ may be established by an engine testing operation in which the exhaust gas hydrocarbon content is actually measured over a range of speeds and loads while there are no misfires or very few misfires occurring. Thus, the value $C_H$ for a given engine speed and load represents the level of hydrocarbons which would be expected to normally be present at such speed and load under conditions where few or no misfires are occurring. The normalizing value $C_H$ may, for example, be defined and mapped as a volumetric percentage of hydrocarbons in the exhaust gas.

When the hydrocarbon content normalizing value $C_H$ is determined, the exhaust gas hydrocarbon content, HCON, can then be estimated by the following calculation:

$$HCON=(MF/RATIO_{AF})+C_H$$

as indicated in step 110. The resulting hydrocarbon content value HCON is a volumetric percentage of hydrocarbons in the exhaust gas. This equation for estimating the exhaust gas hydrocarbon content is justified based upon the following observations. First, the hydrocarbon content normalizing value $C_H$ accounts for the level of hydrocarbons which would normally be present without misfires. Second, as the number of misfires of an engine increases the level of hydrocarbons in the exhaust gas will increase because the hydrocarbons in the fuel are not being burned in the combustion chamber. Thus, as seen in the above equation the estimated exhaust gas hydrocarbon content HCON increases as the misfire rate MF increases. Third, the level of hydrocarbons in the mixture of air and fuel entering the combustion chambers will vary as the air/fuel ratio varies. In particular, as the air/fuel ratio increases the level of hydrocarbons decreases. Accordingly, the level of hydrocarbons in an air/fuel mixture which passes through a combustion chamber without burning, as in the case of a misfire, will likewise vary as the air/fuel ratio varies. Thus, in the above equation the misfire rate MF is divided by the air/fuel ratio $RATIO_{AF}$.

Once the estimated exhaust gas hydrocarbon content calculation is made, it may be desirable to compare the determined HCON value to a predetermined exhaust gas hydrocarbon content level as depicted in step 112. For example, the predetermined level may be selected as a level above which combustion in the exhaust path might occur. Alternatively, the predetermined level may be selected based upon the levels which the catalytic converter is capable of handling. Further, the predetermined level may be selectable by the operator depending upon the application. Regardless of how the predetermined level is selected, it is expected that if the estimated exhaust gas hydrocarbon content exceeds the predetermined level a corrective or protective action will be initiated. In many circumstances the protective action will be to effect shut down of the engine as indicated in step 114. It is also recognized that a system may operate so that the engine is shut down only if the HCON value exceeds the predetermined level a certain number of times in a row, or only if the HCON value exceeds the predetermined level a certain number of times within a given time period. As used herein the operation or step of shutting down the engine if the estimated exhaust gas hydrocarbon content exceeds the predetermined level is intended to encompass situations where the engine is shut down the first time the estimated exhaust gas hydrocarbon content exceeds the predetermined level, situations where the engine is shut down only after the estimated exhaust gas hydrocarbon content exceeds the predetermined level a certain number of times in a row, and/or situations where the engine is only shut down after the estimated exhaust gas hydrocarbon content exceeds the predetermined level a certain number of times within a given time period. It is further recognized that a system may operate so that the engine is only shut down if one or more other conditions are met in addition to the estimated exhaust gas hydrocarbon content exceeding the predetermined level. As used herein the operation or step of shutting down the engine if the estimated exhaust gas hydrocarbon content exceeds the predetermined level is likewise intended to encompass both situations where no additional conditions need to be met in order to shut down the engine and situations where one or more additional conditions need to be met in order to shut down the engine. Block 116 indicates the END of the estimation routine.

INDUSTRIAL APPLICABILITY

The system and method of the present invention facilitates monitoring of the exhaust gas hydrocarbon content of an internal combustion engine using available engine hardware and sensors. The need for an expensive hydrocarbon content measuring probe in the exhaust path is eliminated thereby reducing costs in engine applications where hydrocarbon content monitoring is necessary or desired. If the monitored exhaust gas hydrocarbon content exceeds a predetermined level corrective/protective action may be initiated such as activating an operator alarm or shutting down the engine entirely. Shutting down the engine in such situations reduces the likelihood that any exhaust path equipment will be damaged due to explosions or excessive heat.

The present exhaust gas hydrocarbon content estimating technique can be incorporated into many different internal combustion engine configurations. In this regard it is recognized that a variety of techniques for determining an engine misfire rate and for determining an engine air/fuel ratio exist and could be utilized in conjunction with the present invention. For example, although maintaining a running count of identified engine misfires is described above, the same result can be achieved by maintaining a running count of good combustion conditions and subtracting such count from the expected number of combustion conditions. Further, although the absence of an expected signal is described above as identifying a misfire it is likewise recognized that even where a signal is present a misfire could be identified if a parameter of such signal does not meet one or more predetermined criteria. Still further, a monitored engine parameter could be correlated to an engine misfire rate through use of a map. With respect to determining the air/fuel ratio it is recognized that many known techniques for making such determination could be incorporated into the present invention, including techniques used in engines having carburetors and engines including fuel injectors.

Further, although the preferred embodiment has been described as estimating the exhaust gas hydrocarbon content as a volumetric hydrocarbon percentage in the exhaust gas, it is recognized that the exhaust gas hydrocarbon content may be determined in terms of other units. For example, where the fuel flow FF and air flow AF are determined as mass flows, and where the hydrocarbon content normalizing value $C_H$ is defined and mapped as the mass percentage of hydrocarbon in the exhaust gas, the estimated exhaust gas hydrocarbon content HCON may be determined as a mass percentage of hydrocarbon in the exhaust gas.

Still further, the exhaust gas hydrocarbon content need not be determined on a percentage basis in order to achieve the beneficial operational and functional results described above. In such cases the exhaust gas hydrocarbon content could, for example, be determined in accordance with the following equation:

$$HCON=(MF*FF)+C_H,$$

where fuel flow FF could be defined as a volumetric flow or as a mass flow and hydrocarbon content normalizing value $C_H$ could be defined and mapped as a volumetric flow or mass flow accordingly. The resulting estimated exhaust gas hydrocarbon content HCON would then be either a volumetric flow of hydrocarbons or a mass flow of hydrocarbons. In either case, the estimated hydrocarbon content HCON could be compared to a predetermined acceptable hydrocarbon flow level which takes into account the air flow AF. For example, the predetermined acceptable hydrocarbon flow level could be stored as a look-up table or map as a function of air flow AF. As a general rule it is likely, although not absolutely necessary, that the mapped predetermined acceptable hydrocarbon flow level would increase as the air flow AF increased.

Other aspects, objects and advantages of the present invention can be obtained from a study of the drawings, the disclosure and the appended claims.

What is claimed is:

1. A system for monitoring exhaust gas hydrocarbon content of an internal combustion engine including at least one combustion chamber, the system comprising:

at least one sensing device for detecting whether expected combustion conditions occur within the at least one combustion chamber and responsively producing signals indicative of whether the expected combustion conditions occur within the at least one combustion chamber; and an electronic controller connected to the at least one sensing device and receiving signals therefrom, said electronic controller being operable to determine an estimated exhaust gas hydrocarbon content based at least in part upon the signals received from the at least one sensing device, to determine an engine misfire rate based upon the signals received from the at least one sensing device, and to determine the estimated exhaust gas hydrocarbon content as a function of at least the determined misfire rate.

2. The system, as set forth in claim 1, wherein the electronic controller is operable to compare the estimated exhaust gas hydrocarbon content to a predetermined exhaust gas hydrocarbon content.

3. The system, as set forth in claim 2, wherein the electronic controller is operable to effect shut down of the engine if the estimated exhaust gas hydrocarbon content exceeds the predetermined exhaust gas hydrocarbon content.

4. The system, as set forth in claim 1, wherein the engine includes a plurality of combustion chambers and the at least one sensing device comprises a distinct sensing device associated with each combustion chamber, the electronic controller connected to each sensing device for receiving signals therefrom.

5. A system for monitoring exhaust gas hydrocarbon content of an internal combustion engine having a plurality of combustion chambers, the system comprising:

a combustion probe positioned within each combustion chamber, said combustion probe detecting whether expected combustion conditions occur within a respective combustion chamber and responsively producing signals indicative of whether the expected combustion conditions occur within the respective combustion chamber; and an electronic controller connected to each combustion probe and receiving signals therefrom, said electronic controller being operable to determine an estimated exhaust gas hydrocarbon content based at least in part upon the signals received from each combustion probe.

6. The system, as set forth in claim 5, wherein the electronic controller comprises an electronic control module and a process loop controller, at least one communication link connecting the process loop controller to the electronic control module.

7. A system for monitoring exhaust gas hydrocarbon content of an internal combustion engine including at least one combustion chamber, the system comprising:

at least one sensing device for detecting whether expected combustion conditions occur within the at least one combustion chamber and responsively producing signals indicative of whether the expected combustion conditions occur within the at least one combustion chamber; and an electronic controller connected to the at least one sensing device and receiving signals therefrom, said electronic controller being operable to determine an estimated exhaust gas hydrocarbon content based at least in part upon the signals received from the at least one sensing device, to determine an engine misfire rate based upon the signals received from the at least one sensing device and to determine an air/fuel ratio based upon at least one sensed engine parameter, and wherein the estimated exhaust gas hydrocarbon content is determined as a function of at least the determined engine misfire rate and the determined air/fuel ratio.

8. The system, as set forth in claim 7, further comprising:

a speed sensor for sensing a speed of the engine and producing an engine speed indicative signal; and wherein the electronic controller is operable to determine a hydrocarbon content normalizing value as a function of at least the engine speed, and wherein the estimated exhaust gas hydrocarbon content is determined as a function of at least the determined engine misfire rate, the determined air/fuel ratio, and the determined hydrocarbon content normalizing value.

9. A system for monitoring exhaust gas hydrocarbon content of an internal combustion engine having a plurality of combustion chambers each having a gaseous fuel admission valve associated with an intake port thereof, the system comprising:

at least one sensing device for detecting whether expected combustion conditions occur within the at least one combustion chamber and responsively producing signals indicative of whether the expected combustion conditions occur within the at least one combustion chamber;

an electronic controller connected to the at least one sensing device and receiving signals therefrom, said electronic controller being operable to determine an estimated exhaust gas hydrocarbon content based at least in part upon the signals received from the at least one sensing device;

a speed sensor for sensing a speed of the engine and producing an engine speed indicative signal;

a first pressure sensor for sensing the air pressure within an engine air intake manifold and producing an intake air pressure indicative signal;

a first temperature sensor for sensing the air temperature within the engine air intake manifold and producing an intake air temperature indicative signal;

a second pressure sensor for sensing the differential pressure between a gaseous fuel manifold and the air intake manifold, and producing a differential pressure indicative signal;

a second temperature sensor for sensing the gaseous fuel temperature within the gaseous fuel manifold and producing a gaseous fuel temperature indicative signal;

each of the speed sensor, the first pressure sensor, the second pressure sensor, the first temperature sensor, and the second temperature sensor connected to the electronic controller for providing its respective signal thereto;

said electronic controller being operable to determine:
  (i) an engine misfire rate as a function of at least the signals received from the at least one sensing device and the engine speed;
  (ii) an air/fuel ratio as a function of the intake air pressure, the intake air temperature, the engine speed, the differential pressure, and the gaseous fuel temperature;
  (iii) a hydrocarbon content normalizing value as a function of the engine speed and an engine load; and
  (iv) the estimated exhaust gas hydrocarbon content as a function of at least the engine misfire rate, the air/fuel ratio, and the hydrocarbon content normalizing value.

10. A method of monitoring an exhaust gas hydrocarbon content of an internal combustion engine including a plurality of combustion chambers, the method comprising the steps of:

(a) determining a misfire rate of the engine based upon at least one sensed engine parameter;

(b) determining an estimated exhaust gas hydrocarbon content as a function of at least the engine misfire rate determined in step (a).

11. The method, as set forth in claim 10, including the steps of:

(c) determining an air/fuel ratio being delivered to the combustion chambers; and wherein in step (b) the estimated exhaust gas hydrocarbon content is determined as a function of the misfire rate determined in step (a) and the air/fuel ratio determined in step (c).

12. The method, as set forth in claim 11, including the step of:

(d) determining a hydrocarbon content normalizing value; and wherein in step (b) the estimated exhaust gas hydrocarbon content is determined as a function of at least the misfire rate determined in step (a), the air/fuel ratio determined in step (c), and the hydrocarbon content normalizing value determined in step (d).

13. The method, as set forth in claim 12, wherein step (d) includes determining a speed of the engine;

determining a load of the engine; and determining the hydrocarbon content normalizing value as a function of at least the determined speed and the determined load.

14. The method, as set forth in claim 10, further including the steps of:

comparing the estimated exhaust gas hydrocarbon content determined in step (b) with a predetermined exhaust gas hydrocarbon content; and shutting down the engine if the estimated exhaust gas hydrocarbon content determined in step (b) exceeds the predetermined exhaust gas hydrocarbon content.

15. The method, as set forth in claim 10, wherein step (a) includes:

detecting whether an expected combustion condition occurs within each of the combustion chambers;

identifying the absence of an expected combustion condition within a given combustion chamber as a misfire.

16. The method, as set forth in claim 10, wherein step (a) involves monitoring the ionization level within each combustion chamber.

* * * * *